(12) United States Patent
Wang et al.

(10) Patent No.: US 8,384,848 B2
(45) Date of Patent: Feb. 26, 2013

(54) EDGE-LIGHTING LED BACKLIGHT AND LCD THEREOF

(75) Inventors: Qingjiang Wang, Beijing (CN); Xingxing Zhao, Beijing (CN); Xiaobin Sun, Beijing (CN); Lifang Wan, Beijing (CN); Lilei Zhang, Beijing (CN); Gang Wang, Beijing (CN); Xibin Shao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 805 days.

(21) Appl. No.: 12/542,422

(22) Filed: Aug. 17, 2009

(65) Prior Publication Data
US 2010/0103344 A1 Apr. 29, 2010

(30) Foreign Application Priority Data
Oct. 23, 2008 (CN) .......................... 2008 1 0225007

(51) Int. Cl.
*G02F 1/1335* (2006.01)
*G09F 13/04* (2006.01)
(52) U.S. Cl. .............. 349/65; 349/61; 349/62; 362/97.3
(58) Field of Classification Search .................... 349/65, 349/61, 62; 362/97.3
See application file for complete search history.

(56) References Cited

U.S. PATENT DOCUMENTS
2006/0221641 A1* 10/2006 Yoon et al. ..................... 362/623
2007/0008739 A1* 1/2007 Kim et al. ...................... 362/612
2007/0147074 A1* 6/2007 Sakai et al. .................... 362/608
2011/0149204 A1* 6/2011 Son ................................ 349/62

FOREIGN PATENT DOCUMENTS
CN 1991237 A 7/2007
JP 2001-014922 A 1/2001

* cited by examiner

*Primary Examiner* — Mike Qi
(74) *Attorney, Agent, or Firm* — Ladas & Parry LLP

(57) ABSTRACT

The present invention relates to an edge-lighting LED backlight and LCD. The edge-lighting LED backlight comprises an LED light bar and a light guide plate, wherein a reflector is disposed between the LED light bar and the light guide plate, holes are set on the reflector, and light emitted from the LED light bar enters into the light guide plate through the holes. An LCD comprises the above edge-lighting LED backlight. In the above solution, the surface reflectance of the LED light bar is improved, the light loss is decreased and the utilization rate of light is improved by disposing the reflector between the LED light bar and the light guide plate, which decreases the quantity of the LEDs and the cost of the backlight.

3 Claims, 3 Drawing Sheets

EDGE-LIGHTING LED BACKLIGHT AND LCD THEREOF

CROSS-REFERENCE TO RELATED APPLICATIONS

This application claims priority to Chinese Patent Application No. 200810225007.8, filed on Oct. 23, 2008, entitled "EDGE-LIGHTING LED BACKLIGHT AND LCD", which is incorporated herein by reference in its entirety.

FIELD OF THE TECHNOLOGY

The present invention relates to a liquid crystal display technology field, and particularly to an edge-lighting light-emitting diode (LED) backlight and liquid crystal display (LCD) which may improve overall light effect.

BACKGROUND OF THE INVENTION

In an LCD device, LED backlight is increasingly popular with LCD device manufacturers depending on its advantages of lightness and thinness, good resistant of impact strength and vibratility, good color rendition, pollution-free and being droved by low voltage and direct current. In an LED backlight, a lighter edge-lighting LED backlight attracts more attention. And the LED backlight in a small and medium-sized LCD is rapidly replacing cold cathode fluorescent lamp (CCFL) to become a mainstream backlight.

In the prior art, structure of the edge-lighting LED backlight is shown in FIG. 1. The edge-lighting LED backlight includes: up-frame 11, back-frame 12, printed circuit board (PCB) 13, LED 14, light guide plate 15, bottom reflecting plate 16 and optical model 17. The LED 14 is fixed onto the PCB 13, and light emergence plane faces directly to side surface of the light guide plate 15. The light emitted from the LED 14 is guided by the light guide plate 15 and is diffused by the optical model 17 to provide light source for a liquid crystal layer. The bottom reflecting plate 16 reflects light leakage from the LED 14 so as to make full use of the light emitted from the LED 14.

However, to a large-sized LCD with the size of larger than 19", the quantity of the LED used by the LED backlight increases remarkably, which is as shown in FIG. 2. An edge-lighting LED backlight lamp includes PCB 21 and LEDs 22 set thereon. With increase of the size of the LCD, the needed LEDs 22 also increase. As for the large-sized LCD which uses the LED backlight, only the backlight cost thereof exceeds at least 5 dollars than that of the CCFL. Therefore, the LED backlight in the large-sized LCD with the size of larger than 19" has the advantages of lightness and thinness, and pollution-free etc., but it is difficult to achieve mass production as the cost is more expensive.

SUMMARY OF THE INVENTION

The subject of the present invention is to provide an edge-lighting LED backlight and LCD thereof to decrease the cost of the backlight.

In order to realize above subject, the present invention provides an edge-lighting LED backlight, comprising an LED light bar and a light guide plate, wherein a reflector is disposed between the LED light bar and the light guide plate, holes are set on the reflector, and light emitted from the LED light bar enters into the light guide plate through the holes.

The reflector may be attached to a light input surface of the light guide plate, or may be attached to a PCB of the LED light bar; and the holes are set on positions of the reflector corresponding to LEDs on the LED light bar. Moreover, an up-reflector may be disposed between an up-frame and an optical model of the edge-lighting LED backlight.

The present invention provides an LCD which includes the above edge-lighting LED backlight.

In the above solution, the surface reflectance of the LED light bar is improved, the light loss is decreased and the utilization rate of light is improved by disposing the reflector between the LED light bar and the light guide plate, which decreases the quantity of the LEDs and the cost of the backlight.

The present invention will be described in more detail with reference to the drawings and embodiments.

DETAILED DESCRIPTION OF THE PREFERRED EMBODIMENTS

An edge-lighting LED backlight in embodiments of the present invention may includes an LED light bar and a light guide plate, wherein a reflector is disposed between the LED light bar and the light guide plate, holes are set on the reflector, and light emitted from the LED light bar enters into the light guide plate through the holes.

In these embodiments, surface reflectance of the LED light bar is improved, light loss is decreased and utilization rate of light is improved by disposing the reflector between the LED light bar and the light guide plate, which decreases the quantity of the LEDs and the cost of the backlight.

The reflector disposed between the LED light bar and the light guide plate may be attached to a light input surface of the light guide plate, or may be attached onto a PCB of the LED light bar.

Figure 1:
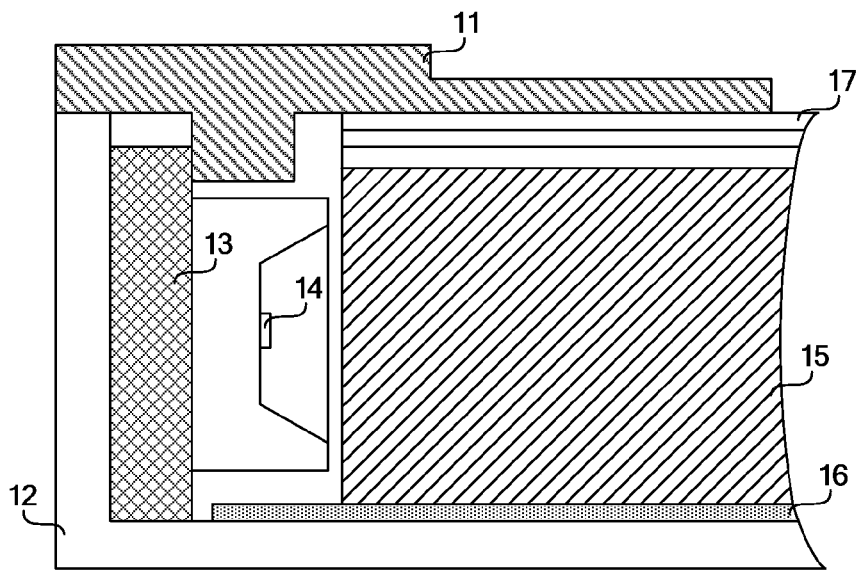
FIG. 1 is a structure view showing an edge-lighting LED backlight in the prior art.
Figure 2:
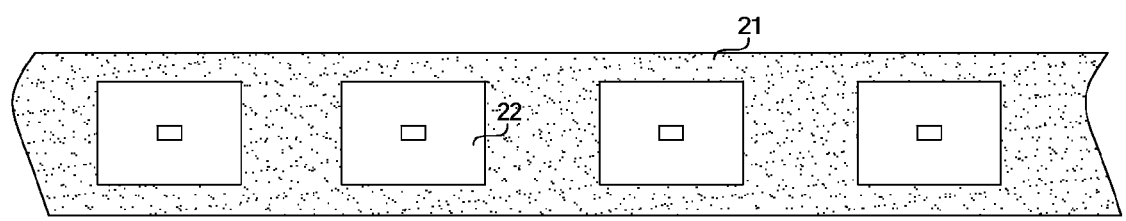
FIG. 2 is a schematic view showing an edge-lighting LED backlight lamp in the prior art.
Figure 3:
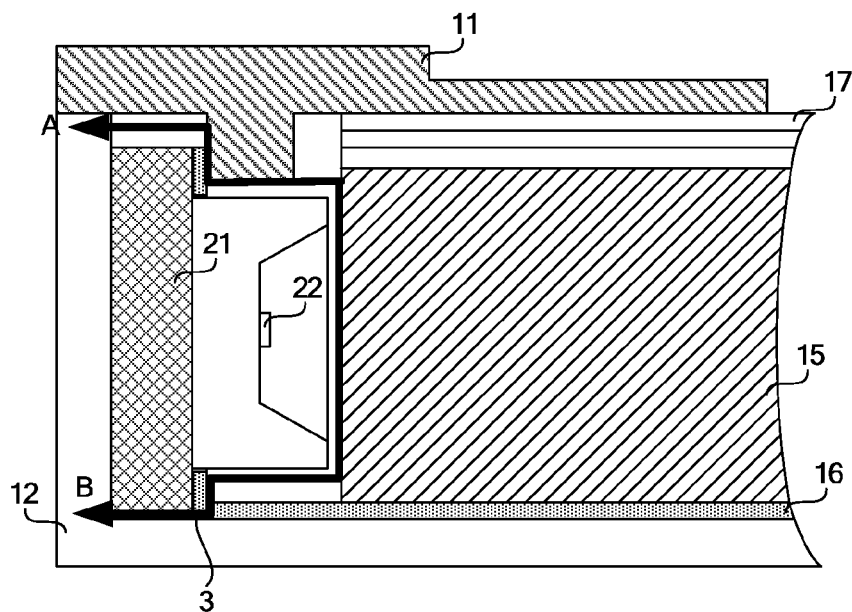
FIG. 3 is a structure view showing an edge-lighting LED backlight in a first embodiment of the present invention.
Figure 4:
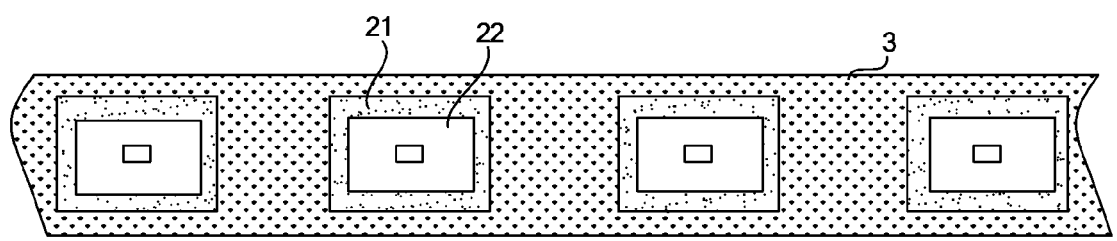
FIG. 4 is a view along a direction of A-B in FIG. 3.

FIG. 3 is the structure view showing the edge-lighting LED backlight in the first embodiment of the present invention. FIG. 4 is the view along a direction of A-B in FIG. 3. As shown in the FIG. 3 and FIG. 4, the holes are set on the reflector 3 to provide exit for the light. In this embodiment, the reflector 3 is attached to the LED light bar, and the LEDs 22 are infixed into the corresponding holes. The backlight improves the surface reflectance of the LED light bar by using the reflector 3, avoids the light loss of the surface of the LED light bar, increases effective reflecting area of the light and improves the utilization rate of light. Therefore, the quantity of the LEDs on the backlight is decreased while brightness of the backlight being kept.

Figure 5:
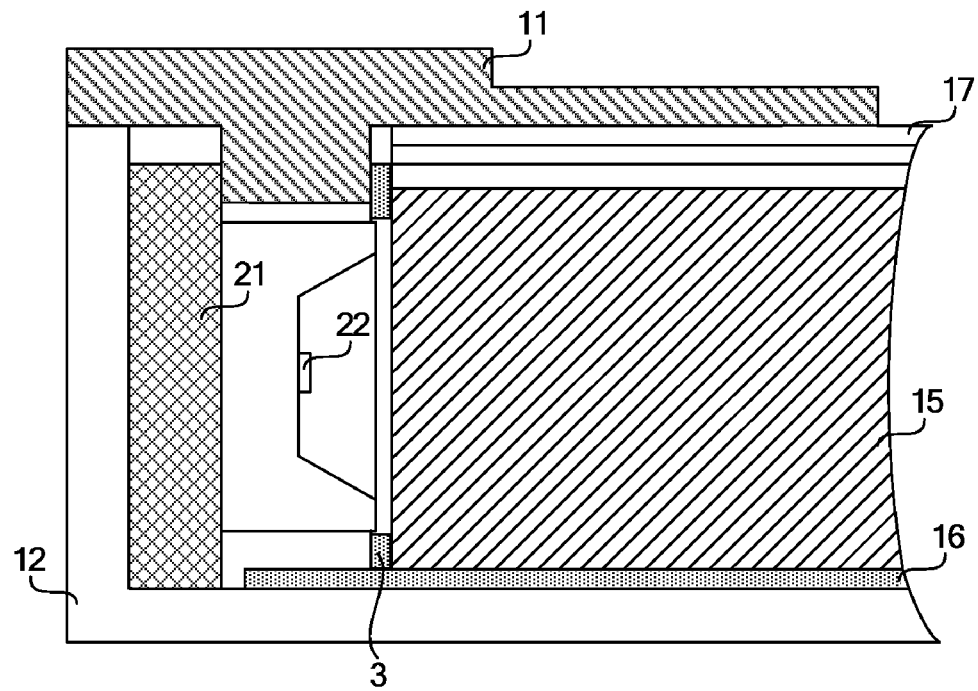
FIG. 5 is a structure view showing an edge-lighting LED backlight in a second embodiment of the present invention.

FIG. 5 is the structure view showing the edge-lighting LED backlight in the second embodiment of the present invention. The part front view of the reflector 3 in FIG. 5 is as shown in FIG. 4. In this embodiment, the reflector 3 is attached to a side of the light guide plate, ie. a light input surface. All the positions on the reflector 3 corresponding to the LEDs 22 have the holes, and the light emitting surface of the LEDs 22 are embedded into the holes of the reflector 3. The thickness of the reflector 3 may be increased so as to improve stability of the structure of the backlight.

When fixing, a thicker reflector 3 may be attached to the light input surface of the light guide plate 15, and light-emitting surface of the LEDs 22 are put into the holes of the reflector 3, avoiding directly touch between the light emitting surface of the LEDs and the light input surface of the light guide plate 15.

Figure 6:
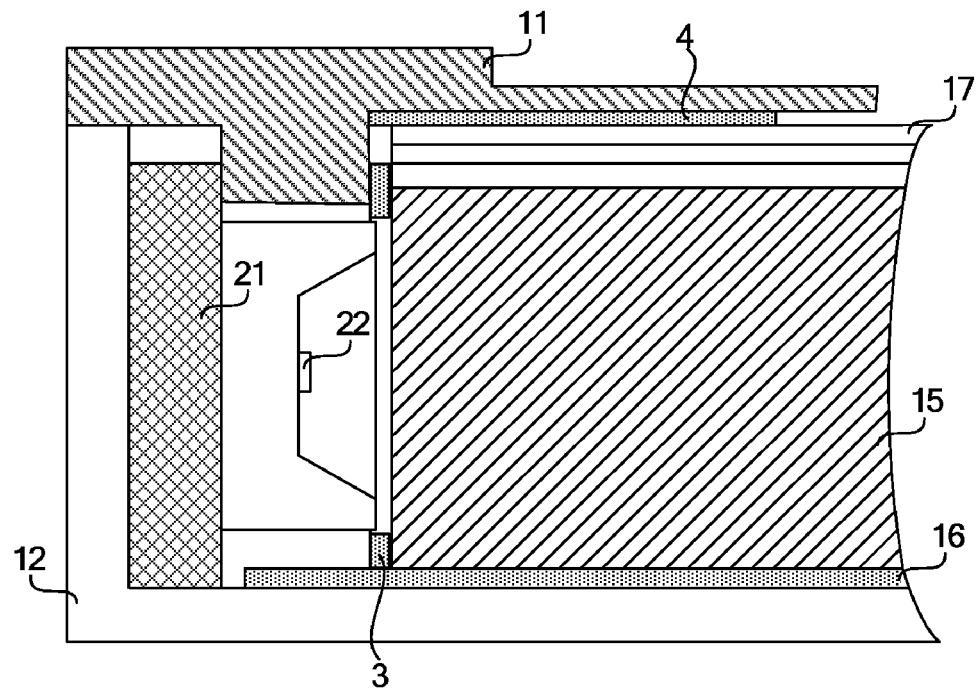
FIG. 6 is a structure view showing an edge-lighting LED backlight in a third embodiment of the present invention.

In the above embodiments, the reflector may be further disposed inside the up-frame 11, as shown in FIG. 6. Another reflector 4 may be disposed between the up-frame 14 and the optical model 17 so as to further decrease the light loss and improve the utilization rate of the light. Thereby, the quantity of the needed LEDs is further decreased and the cost is saved. When fixing, in the contact part of the side of the up-frame 11 and the neighborhood of the light output surface of the LEDs 22, another reflector 4 is used to cover a part of the up-frame 11 so as to further improve the surface reflectance of the light, decrease the light loss and effectively improve the brightness of the backlight.

Any one of the edge-lighting LED backlights according to the above embodiments may be disposed in the LCD. As the cost of the backlight is lower, the cost of the LCD is decreased accordingly.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. An edge-lighting LED backlight, comprising an LED light bar and a light guide plate, wherein a reflector is disposed between the LED light bar and the light guide plate, holes are set on the reflector, and light emitted from the LED light bar enters into the light guide plate through the holes, and the reflector is attached to a light input surface of the light guide plate, and the holes are set on positions of the reflector corresponding to LEDs on the LED light bar.

2. The edge-lighting LED backlight according to claim 1, wherein an up-reflector is disposed between an up-frame and an optical model of the edge-lighting LED backlight.

3. An LCD, comprising the edge-lighting LED backlight according to claim 1.

\* \* \* \* \*